Patented Sept. 4, 1923.

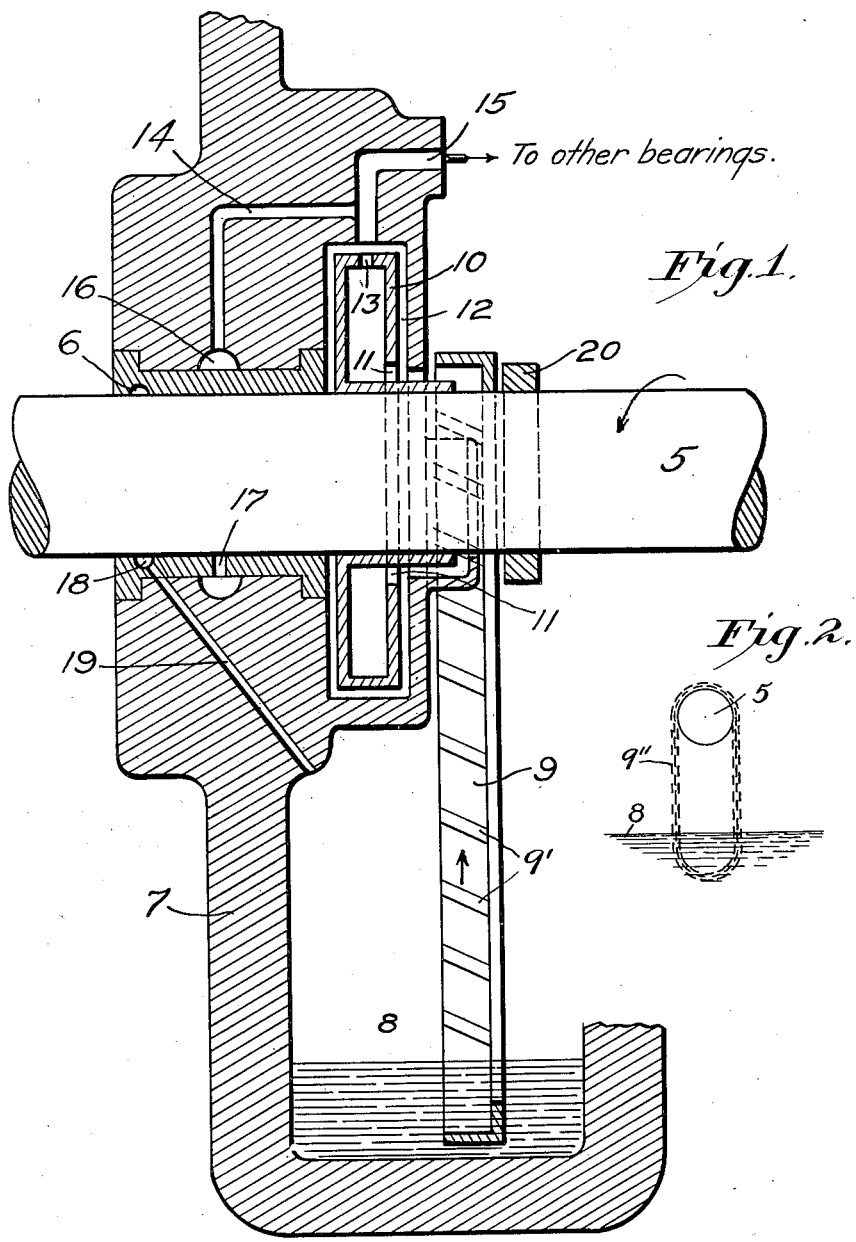

1,466,731

UNITED STATES PATENT OFFICE.

HENRY F. SCHMIDT, OF WILKINSBURG, PENNSYLVANIA, ASSIGNOR TO WESTINGHOUSE ELECTRIC & MANUFACTURING COMPANY, A CORPORATION OF PENNSYLVANIA.

LUBRICATION SYSTEM.

Application filed April 24, 1918. Serial No. 230,449.

*To all whom it may concern:*

Be it known that I, HENRY F. SCHMIDT, a citizen of the United States, and a resident of Wilkinsburg, in the county of Allegheny and State of Pennsylvania, have made a new and useful Invention in Lubrication Systems, of which the following is a specification.

This invention relates to lubrication systems and has for an object to produce a new and improved system for delivering lubricant to bearings.

A further object is to produce simple, cheap and reliable means for delivering lubricant to bearings or other parts to be lubricated.

A further object is to produce a simple and cheap lubrication system for delivering oil under pressure to bearings.

These and other objects are attained by means of a lubrication system embodying the features herein described and illustrated in the drawings accompanying and forming a part hereof.

Bearings are frequently lubricated by providing a ring oiler on the shaft adjacent to each bearing. The ring rides loosely on the shaft to be lubricated, and is considerably larger in diameter so as to dip into a lubricant stored in a reservoir below the bearing. As the shaft is rotated the ring picks up lubricant and carries it up to the shaft and therefore to the bearing to be lubricated. In this manner a relatively small amount of oil under practically no pressure is delivered to each bearing.

My invention contemplates a system in which a ring oiler is employed for delivering relatively large quantities of lubricant to the inlet of a centrifugal impeller which may be mounted on the shaft to be lubricated. The centrifugal impeller forces the lubricant into the bearings under pressure and, if desired, in considerable volume. The efficiency of the lubrication is therefore improved, enabling high speed and pressures to be employed in the bearings. If desired, one impeller may deliver lubricant, hereinafter called oil, to several bearings.

Fig. 1 of the drawings is a diagrammatic sectional view of apparatus embodying my invention.

Fig. 2 is a diagrammatic showing of a modification of a detail of the invention.

In the drawing I have illustrated a bearing 6 for a shaft 5. This bearing is mounted or formed in a frame 7, which may be a part of the machine to which the shaft 5 belongs. As shown, the casing 7 is so formed as to provide a relatively large oil reservoir 8 below the bearing 6 and the shaft 5.

In the illustrated embodiment of my invention I provide a relatively large ring 9 of L shaped cross-section, which rides on the shaft 5 and dips into the oil within the reservoir 8. As the shaft 5 rotates the ring 9 is carried around by rolling contact and carries a considerable quantity of oil up to the shaft 5.

A centrifugal impeller 10 is mounted on the shaft 5 between the ring 9 and the bearing 6 and is adapted to receive the oil carried up by the ring 9 and force it into the bearing 6 under pressure. As shown, the centrifugal impeller 10 consists of an annular member having an annular inlet opening or port 11 at its inner periphery adjacent to and around the shaft 5. A collecting chamber 12, formed within casing 7 adjacent to the bearing 6, surrounds the impeller 10 and is adapted to receive the oil discharged by centrifugal force through holes 13 in the outer peripheral face of the impeller. The impeller may be provided with vanes but, as shown, depends on frictional contact with its walls to accelerate and throw out the oil under pressure.

A conduit or oil passage 14, shown formed within the casing 7, is employed for delivering oil under pressure from the collecting chamber 11 to the bearing 6. I have also shown a branch passageway 15 which may be employed for delivering oil to other bearings. As shown, the oil delivered by the passageway 14 enters an annular chamber 16, which surrounds the bearings 6 and which delivers oil to the working surfaces of the bearing by means of holes 17. Oil which works through the bearings along the shaft 5 in one direction enters the collecting chamber 12 and is pumped back to the bearing by the impeller. Oil which flows along the shaft in the other direction is collected in an annular groove 18 near the edge of the bearings 6 and is returned to the reservoir 8 by gravity through the conduit or passageway 19.

The oiler ring 9 is illustrated as of L shaped cross-section, one of the legs of the angle forming a radially extending flange which bears on the shaft 5. A ring of this shape is capable of carrying more oil than a flat ring, and if desired, vanes or buckets 9' may be formed in the ring to increase its oil delivering capacities. A chain 9" may also be employed for this purpose as illustrated in Fig. 2. As shown, a collar 20 is provided on the shaft for preventing the ring 9 from working along the shaft away from the inlet 11 of the impeller 10.

The arrangement illustrated is compact and simple. The oil pump is formed in the housing of the bearing and immediately adjacent to the latter so that little extra room is required. The impeller 10 may be designed to deliver oil to the bearings at different pressures and volumes depending on the class of work and the operating conditions to be met by the bearing.

While I have illustrated and described but one embodiment of my invention, it will be apparent to those skilled in the art that various changes, modifications, additions and omissions may be made in the apparatus described without departing from the spirit and scope of the invention as set forth in the appended claims.

What I claim is:

1. A lubrication system comprising a shaft, a bearing in which said shaft is mounted, a ring oiler actuated thereby for delivering lubricant thereto, and a centrifugal impeller mounted on the shaft for receiving the lubricant delivered thereto and for delivering said lubricant to the bearing under pressure.

2. In a lubricating system, a centrifugal oil pump for pumping oil under pressure, through the system, a shaft forming a part of said pump, a lubricant chamber located below said shaft, and a ring oiler riding on said shaft for lifting lubricant from the chamber and for delivering it to the centrifugal pump.

3. In combination, a shaft, a bearing in which said shaft operates, a centrifugal impeller carried by the shaft, a housing for the impeller and the bearing, a lubricant reservoir located beneath the housing and means cooperatively associated with the shaft to raise the lubricant from the reservoir to the housing.

4. A lubrication system comprising a bearing to be lubricated, a shaft operating in said bearing, a centrifugal pump mounted on said shaft for delivering lubricant under pressure to the bearing, and a ring for picking up lubricant and for delivering it to the centrifugal pump.

5. In a lubrication system, a bearing, a shaft supported in said bearing, a lubricant reservoir located below the shaft, a ring oiler riding on said shaft and dipping into the lubricant in the reservoir, and centrifugal means for receiving the lubricant picked up by the ring and for delivering it to the bearing.

6. In a lubrication system, a bearing, a shaft supported in said bearing, a lubricant reservoir located below the shaft, a ring oiler riding on said shaft and dipping into the lubricant in the reservoir, centrifugal means for receiving the lubricant picked up by the ring and for delivering it to the bearing.

7. In a lubricating system, a bearing, a shaft operating therein, a hollow disc-shaped impeller mounted on said shaft adjacent to the bearing for pumping oil into said bearing, said impeller having peripheral outlet openings and an annular inlet opening in one side thereof, a housing enclosing the bearing and forming a casing around the impeller, the side of the housing adjacent the impeller being spaced from the shaft to form an annular opening which is cooperatively associated with the annular opening in the impeller to deliver oil into the impeller and means to deliver oil from the impeller housing to the bearing.

8. In combination, a shaft, an oil impeller mounted on the shaft, a bearing in which the shaft operates, a housing for the impeller and supporting the bearing, said housing having an annular oil channel surrounding the shaft and provided with an oil passage establishing communication between the bearing and the channel, a reservoir beneath the bearing and means carried by the shaft to supply oil from the reservoir to the impeller whereby lubricant may be drawn through the channel and forced to the bearing by the impeller.

9. In combination, a shaft, a bearing in which the shaft operates, a housing for supporting the bearing having an annular oil channel surrounding the shaft and provided with an oil passage establishing communication between the bearing and the channel, means comprising a hollow disc-shaped impeller having an annular opening to receive oil and peripheral discharge openings for exerting pressure on the oil in the channel whereby oil is forced through the said passage to the bearing, and means for returning oil flowing from the bearing to the said channel.

10. In combination, a shaft, a bearing in which the shaft operates, a housing for supporting the bearing having an annular oil channel surrounding the shaft and provided with an oil passage establishing communication between the bearing and the channel, means for supplying the channel with oil and a hollow disc-shaped centrifugal impeller mounted on the shaft within the housing and adapted to collect oil therein and force the same through peripheral openings to the said passage leading to the bearing.

11. In combination, a shaft, a bearing for the shaft, a hollow impeller mounted on the shaft, a unit housing for the bearing and the impeller, an annular opening in the housing and an annular opening at the central portion of the impeller cooperatively associated therewith to receive oil into the impeller and means to conduct the oil under pressure to the bearing.

In testimony whereof, I have hereunto subscribed my name this 22nd day of April, 1918.

HENRY F. SCHMIDT.

Witness:
C. W. McGhee.